United States Patent
Barnett et al.

(10) Patent No.: US 7,396,610 B2
(45) Date of Patent: Jul. 8, 2008

(54) SUBSTRATE

(75) Inventors: Christopher James Barnett, Henley on Thames (GB); John Malcolm Gascoyne, Bucks (GB); Graham Alan Hards, Reading (GB); Thomas Robertson Ralph, Reading (GB)

(73) Assignee: Johnson Matthey Public Limited Company, London (GB)

( * ) Notice: Subject to any disclaimer, the term of this patent is extended or adjusted under 35 U.S.C. 154(b) by 952 days.

(21) Appl. No.: 10/477,959

(22) PCT Filed: May 14, 2002

(86) PCT No.: PCT/GB02/02121

§ 371 (c)(1), (2), (4) Date: Jun. 2, 2004

(87) PCT Pub. No.: WO02/093669

PCT Pub. Date: Nov. 21, 2002

(65) Prior Publication Data

US 2004/0214071 A1    Oct. 28, 2004

(30) Foreign Application Priority Data

May 17, 2001    (GB)    .................... 0112021.1

(51) Int. Cl.
*H01M 2/08*    (2006.01)
*H01M 8/10*    (2006.01)
*H01M 4/00*    (2006.01)
*H01M 4/82*    (2006.01)

(52) U.S. Cl. .............. 429/35; 429/30; 429/44; 29/623.3

(58) Field of Classification Search ............... 429/35, 429/30, 44; 29/623.3
See application file for complete search history.

(56) References Cited

U.S. PATENT DOCUMENTS

| 5,264,299 A | 11/1993 | Krasij et al. |
| 5,284,718 A | 2/1994 | Chow et al. |
| 5,464,700 A * | 11/1995 | Steck et al. ................ 429/30 |
| 6,020,083 A | 2/2000 | Breault et al. |

(Continued)

FOREIGN PATENT DOCUMENTS

EP    0 838 872 A2    4/1998

(Continued)

OTHER PUBLICATIONS

International Search Report dated Sep. 5, 2003, from International Application No. PCT/GB02/02121.

(Continued)

*Primary Examiner*—Patrick Joseph Ryan
*Assistant Examiner*—Thomas H. Parsons
(74) *Attorney, Agent, or Firm*—RatnerPrestia

(57) ABSTRACT

The present invention relates to a membrane electrode assembly wherein each gas diffusion substrate comprises a porous electrically conductive gasket member is located on the first and second planar faces of a peripheral portion of the sheet material. The electrocatalyst layers are not present adjacent to the gasket members and the edge of the membrane is sandwiched between the gasket members. The invention further relates to integrated cell assemblies and fuel cell stacks comprising membrane electrode assemblies according to the invention.

19 Claims, 5 Drawing Sheets

U.S. PATENT DOCUMENTS

| | | | |
|---|---|---|---|
| 6,066,409 A | 5/2000 | Ronne et al. | |
| 6,159,628 A | 12/2000 | Rajpolt et al. | |
| 6,165,634 A | 12/2000 | Krasij et al. | |
| 6,667,124 B2 * | 12/2003 | Suenaga et al. | 429/35 |

FOREIGN PATENT DOCUMENTS

| | | |
|---|---|---|
| EP | 0 450 849 B1 | 1/2000 |
| EP | 0 791-974 B1 | 1/2000 |
| EP | 1 063 716 A2 | 12/2000 |
| WO | WO-00/10216 | 2/2000 |
| WO | WO-00/26975 | 5/2000 |
| WO | WO-00/35037 | 6/2000 |
| WO | WO-00/47816 | 8/2000 |
| WO | WO-00/55933 | 9/2000 |

OTHER PUBLICATIONS

British Search Report dated Oct. 5, 2001, from British Application No. 011202.1.

* cited by examiner

SUBSTRATE

This application is the U.S. National Phase application of PCT International Application No. PCT/GB02/02121.

This invention relates to a membrane electrode assembly with integral sealing, suitable for use in proton exchange membrane fuel cell systems.

Electrochemical cells invariably comprise at their fundamental level a solid or liquid electrolyte and two electrodes, the anode and cathode, at which the desired electrochemical reactions take place. A fuel cell is an energy conversion device that efficiently converts the stored chemical energy of a fuel and an oxidant into electrical energy. The fuel is usually hydrogen, stored as a gas, or methanol stored as a liquid or gas, and the oxidant is air or oxygen. The hydrogen or methanol is oxidised at the anode and oxygen is reduced at the cathode. In these cells gaseous reactants and/or products have to be diffused into and/or out of the cell electrode structures. The electrodes therefore are specifically designed to be porous to gas diffusion in order to optimise the contact between the reactants and the reaction sites in the electrode to maximise the reaction rate. The electrolyte also has to be in contact with both electrodes and in fuel cell devices may be acidic or alkaline, liquid or solid, in nature. In the proton exchange membrane fuel cell (PEMFC), whether hydrogen or methanol fuelled, the electrolyte is a solid proton-conducting polymer membrane, commonly based on perfluorosulphonic acid materials. The PEMFC is the most likely type of fuel cell to find wide application as a more efficient and lower emission power generation technology in a range of markets including stationary and portable power generation devices and in transportation as alternative engines to the internal combustion engine.

A PEM fuel cell stack consists of a plurality of membrane electrode assemblies (MEA) separated by field flow plates (FFP). Multiple MEAs are required as the maximum cell potential available from each unit is insufficient for practical purposes.

The MEA, typically comprises several layers, but can in general be considered, at its basic level, to have five layers which are defined principally by their function. On either side of a membrane, an anode and cathode electrocatalyst (typically prepared from highly dispersed platinum particles carried on a high surface area, corrosion resistant and electrically conductive support material) is incorporated to increase the rates of the desired electrode reactions. In contact with the electrocatalyst containing layers, on the opposite face to that in contact with the membrane, are the anode and cathode gas diffusion substrates (GDS). The anode GDS is designed to be porous and to allow the reactant fuel to enter from the face of the substrate exposed to the reactant fuel supply, and then to diffuse through the thickness of the substrate to the layer which contains the electrocatalyst. The efficient distribution of gas maximises the electrochemical oxidation of hydrogen or methanol. The anode electrocatalyst layer is also designed to comprise some level of the proton conducting electrolyte in contact with the same electrocatalyst reaction sites. With acidic electrolyte types the product of the anode reaction are protons and these can then be efficiently transported from the anode reaction sites through the electrolyte to the cathode layers. The cathode GDS is also designed to be porous and to allow oxygen or air to enter the substrate and diffuse through to the electrocatalyst layer reaction sites. The cathode electrocatalyst combines the protons with oxygen to produce water and is also designed to comprise some level of the proton conducting electrolyte in contact with the same electrocatalyst reaction sites. Product water then has to diffuse out of the cathode structure. The structure of the cathode has to be designed to enable the efficient removal of the product water. If water builds up at the cathode, it becomes more difficult for the reactant oxygen to diffuse to the reaction sites, and the performance of the fuel cell decreases. In the case of methanol fuelled PEMFCs, additional water is present due to the water contained in the methanol, Which can be transported through the membrane from the anode to the cathode side. The increased quantity of water at the cathode requires removal. However, it is also the case with some proton conducting membrane electrolytes, that if too much water is removed from the cathode structure, the membrane can dry out. If the membrane becomes dehydrated the performance of the fuel cell is significantly decreased.

The FFP is typically fabricated from a corrosion resistant, electrically conductive material such as graphite. Alternatives include cheaper and more lightweight materials such as carbon-based materials (eg Graphoil™), carbon polymer composites, or metallic plates formed from selected metals or alloys. The FFP distributes the reactants which are either gaseous (eg hydrogen, air) or liquid (eg methanol) to the GDS layers which then distribute the gas to the electrocatalytic layers. The FFP also serves to conduct electrons from the GDS to the external electrical circuit and also provides a physical support for the MEA within the fuel cell stack. To enable efficient gas distribution to the GDS, the FFP has channels in each planar face which can be machined, moulded, stencilled or stamped depending on the FFP material. The raised areas between the channels, normally termed lands, provide the electrically conductive pathway and the physical support for the MEA. The ratio of the channel to land area is optimised to obtain the best performance from the stack.

In a PEM fuel cell stack there are typically many tens of MEAs, for example 50 to 300 MEAs is not unusual, each interposed between FFPs. For the terminal FFPs in a stack, an anode or cathode channel faces the MEA and the opposite face of the FFP is a solid section which contacts the stack end plate. The remaining FFPs have an anode channel in one face and a cathode channel in the opposite face. These FFPs are known as bipolar FFPs. The anode channel faces the anode of an MEA with the cathode channel on the opposite face contacting the cathode of an adjacent MEA. The FFPs and MEAs in the stack are compressed together at pressures typically from 50 to 200 psi absolute, using for example a bladder or piston system or a series of bolts located in the stack end plates. Typically, one of the stack end plates also contains the necessary ports to provide access and removal from the stack of the reactants, products and any associated humidification water. Ports are also required to provide access to and removal of the stack coolant from the stack cooling plates which are necessary to remove the excess heat generated within the MEAs. Cooling is typically achieved using water or, in low power density applications, air. From the ports in the stack end plate the gases and fluids are transported through the stack to each FFP, which have the porting design removed from their section. The porting design may either be internal to the MEA or external of the MEA.

In the PEM fuel cell stack it is essential that any loss to the atmosphere or any potential mixing of the reactants is prevented. This would lead to a decrease in the overall system efficiency and is a potentially hazardous situation due to the risk of explosion from the mixing of the fuel and oxidant. Sealing and gasketing in the stack are used for the purpose of preventing such occurrences. For the purposes of this description, the term "sealing" is used to denote a method of preventing gas diffusion out of or through a single component For example, the perimeter of a GDS can be sealed by impregnating the perimeter with a sealant material. This would prevent diffusion of gases through the perimeter of the substrate. The term "gasketing" is used to denote a method of preventing gas diffusion between components by placing a resilient material between the two components. A gasket member is a resilient material placed between two components that provides an impermeable barrier through which gases and fluids cannot pass.

Gasketing is generally required between the MEA and the two adjacent FFPs. This prevents the loss or mixing of the reactants and can also serve the function of preventing contact of the FFPs which would short-circuit the cell. The typically employed gasketing method uses an MEA wherein a part of the membrane extends beyond the edge of the GDSs (examples of this method can be found in WO 00/10216). Gaskets are positioned between the protruding membrane and the FFPs. Whilst effective, this technique has a number of disadvantages. The extended membrane area beyond the GDS is redundant from performing its principle function of conducting protons because it is outside the active area of the MEA. Thus a portion of the expensive polymeric material is not being utilised for proton conduction and this is unattractive from a cost perspective. If the excess membrane area is too large it can also remove water from the membrane in the active area, thereby lowering the performance of the MEA. Additionally, the entire surface of the membrane may have been coated with an electrocatalyst layer. If catalyst material is located underneath the gasket there is the possibility that heat will be generated in this region with the possibility of membrane failure. Catalyst particles that are electrically insulated can undergo recombination of hydrogen and oxygen in a heterogeneous gas phase reaction, resulting in localised heat generation and pin-holing of the membrane. This problem is being exacerbated as state of the art PEM fuel cell technology moves towards using thinner membranes of the order of 20-30 µm to decrease the electrical resistance of the cells and enhance water management. In addition with such thin membranes, if gaskets are placed directly on the membrane there is a much enhanced probability of mechanical damage of the membrane by the gasket leading to membrane failure. Using the approach of gasketing directly on the membrane is clearly unsatisfactory since it creates problems of inefficient use of expensive materials and enhanced possibility of membrane failure. Furthermore, such gasket systems are generally assembled using labour intensive manual methods and are not readily applicable to volume production of MEAs.

WO 00/26975 and U.S. Pat. No. 6,020,083 disclose a method of sealing which is said to enable mass production of fuel cells. The MEA components (membrane, catalyst layers and GDSs) and the FFPs are co-extensive. The entire surface of the GDS is coated with a bi-layer of carbon black and PTFE. An elastomeric sealant material such as Fluorolast is applied to the periphery of the GDS such that the void volume of the GDS is filled and the surface of the bi-layer is coated with sealant The peripheral region of the bi-layer is coated with sealant to prevent fuel and/or oxidant gases reaching the region of catalyst layer that is outside the active area of the MEA. A disadvantage of this design is that catalyst and membrane material is wasted outside the active area of the MEA. Furthermore, despite the elastomeric sealant, it is possible that gases will reach the catalyst region that is outside the active area of the MEA and heterogeneous gas phase reactions and associated pin-holing of the membrane could result.

It is an object of the present invention to overcome the disadvantages of the prior art gasketing systems and provide an MEA which will both minimise the amount of expensive, polymer membrane required, and overcome any durability problems associated with the use of very thin membranes. It is a further object of the present invention to provide a system that can facilitate the rapid and accurate formation of an MEA assembly from its sub-components and the rapid integration of said MEA assemblies into the FFPs to form the individual cells of a fuel cell stack; the whole of which process is amenable to automated manufacture.

Most prior art systems are only appropriate for low volume production and cannot be scaled up for mass production. A gasketing system suitable for mass production needs to be simple and must not involve a large number of steps or components. The present inventors have produced an MEA which overcomes the problems associated with the gasketing of prior art MEAs.

Accordingly, the present invention provides a membrane electrode assembly comprising a proton-conducting membrane, two electrocatalyst layers and two gas diffusion substrates such that the membrane is interposed between the electrocatalyst layers and one gas diffusion substrate is adjacent to each electrocatalyst layer, wherein each gas diffusion substrate comprises a porous electrically conductive sheet material having a central portion and a peripheral portion, said peripheral portion having first and second planar faces, and wherein a gasket member is located on the first and second planar faces of said peripheral portion, wherein each electrocatalyst layer does not extend beyond the central portion of the porous electrically conductive sheet material, and wherein the membrane extends beyond the electrocatalyst layers, such that the membrane contacts the gasket members.

The electrocatalyst layer does not extend beyond the central portion of the porous electrically conductive sheet material, and as a result there is no catalyst material adjacent to the gasket. All the catalyst material can therefore be within the active area of the MEA and the risk of heterogeneous phase reactions is removed.

The membrane must extend beyond the electrocatalyst layers such that it is sandwiched between the gasket members on the two GDSs. This prevents gas diffusing between the two GDSs. The gasket member of one GDS contacts one face of the membrane, and the gasket member of the second GDS contacts the other face of the membrane. The membrane may extend beyond the gasket members so that one entire face of each gasket member contacts the membrane. However, in a preferred embodiment, the membrane does not extend to the edge of the gasket members and there is contact between the two gasket members at the outer edge. In this embodiment the amount of membrane that is outside the active area of the MEA is reduced.

Suitably, the gasket member extends beyond the edge of the peripheral portion of the porous electrically conductive sheet material in a direction away from the central portion, such that the edge of said peripheral portion is enveloped by said gasket member.

In one embodiment of the invention, the gasket member impregnates the peripheral portion, in addition to being present as a coating on the first and second planar faces of the peripheral portion of the porous electrically conductive sheet material.

In a second embodiment, the gasket member does not impregnate the peripheral portion, but is only present as a coating on the first and second planar faces of the peripheral portion of the porous electrically conductive sheet material.

In a third embodiment, the peripheral portion of the porous electrically conductive sheet material comprises a plurality of holes through the thickness of the sheet material, wherein said gasket member extends through said holes in addition to being present on the first and second planar faces of said peripheral portion. The gasket member may impregnate the peripheral portion of the sheet material or may only be present as a coating.

The peripheral portion should be sealed so that there is no gas diffusion out of the edge of the porous electrically conductive sheet. If the gasket extends beyond the edge of said peripheral portion in a direction away from the central portion, such that the edge of said peripheral portion is enveloped by said gasket member, this will provide sealing. Alternatively, if the gasket member impregnates the peripheral portion of the sheet material, then sealing is provided. Additionally, the peripheral portion may be impregnated with a sealant that is independent of the gasket member. This sealant should be applied to the periphery of the sheet prior to the application of the gasket member. It is preferred that the gasket member extends beyond the edge of the peripheral portion, such that the edge of the peripheral portion is enveloped by the gasket member because impregnation does not always result in total closure of the void volume of the porous electrically conductive sheet material. By contrast, enveloping the edge of the GDS with the gasket member provides excellent sealing.

The gasket member is suitably formed from a resilient material that after compression, is capable of reverting back to form its original shape. Suitably, the resilient gasket member is formed from a polymeric material. Preferred gasket materials may include elastomers/rubbers (e.g. ethylene propylene rubber), fluoroelastomers (e.g. Viton™ (Dupont Dow Elastomers)), chloroelastomers (e.g. polychloroprene, chlorosulphonated polyethylene), thermoplastic elastomers (e.g. Kraton™ or Dynaflex™ (GLS Corp)), fluorosilicones (e.g. fluoroalkyl polysiloxane), silicone rubber or thermoplastics (e.g. ethylene vinyl acetate, fluorinated ethylene propylene copolymers or Santoprene™ (Bayer)). Suitably the gasket member may be pre-formed and attached to the peripheral portion of the porous electrically conductive sheet material or may be formed in situ.

The gasket member may or may not be symmetrical about a point through the plane of the substrate. By this we mean that the thickness of the gasket member on one of the planar faces of the peripheral portion of the porous electrically conductive sheet material may be equal or different to the thickness of the gasket member on the other planar face of the peripheral portion of the porous electrically conductive sheet material. To ensure successful gasketing against the FFP, the gasket member may have on one side one or more ribs that concentrate the load in a localised area The gasket member may further comprise projections and/or indentations arranged upon the surfaces in such a manner as to enable the accurate location of adjacent parts of an MEA and of a complete cell assembly consisting of the MEA and the adjacent FFP. Said projections may also extend sufficiently as to pass through similarly dimensioned orifices in adjacent parts such that the projections may be compressed, melted or otherwise modified so as to fix the adjacent parts together. The arrangement of the projections and corresponding indentations can, if set out asymmetrically, ensure the correct orientation and selection of adjacent components. In this way it is possible to have a series of unique components that can be assembled in only one fashion, thus ensuring that errors cannot occur and automated assembly is facilitated.

The porous electrically conductive sheet material may be any material suitable for use in a fuel cell. Examples of suitable materials include carbon fibre papers, for example those available from Toray Europe Ltd (Toray TGP-H-60 or TGP-H-90), woven carbon fibre cloths, for example those available from Zoltek Corporation, Missouri, USA (Zoltek PWB-3) and non-woven carbon fibre webs such as those disclosed in EP 0791974, WO 00/47816, WO 00/55933 and EP 1063716, all of which are incorporated herein by reference. In a particular embodiment, the peripheral portion of the electrically conductive sheet material may be thinner than the central portion. This allows a thicker gasket member to be used.

The electrocatalyst layer may comprise any electrocatalyst known to those in the art Suitable electrocatalysts include those described in EP 450849, EP 838872 and WO 00/35037.

A further aspect of the invention is an integrated cell assembly (ICA) comprising an MEA according to the invention joined to an FFP. The components may be joined by any suitable adhesive or via the projection and orifice system discussed previously. The FFP may be a terminal FFP with one set of channels facing the MEA and the opposite face of the FFP being solid. Alternatively, the FFP may be a bipolar FFP with channels on both faces of the plate. It is possible using an MEA according to the invention to provide an ICA having integral gasketing that can be assembled together with the required number of other ICAs in a straightforward manner to form a complete fuel cell stack and wherein no further gasketing is required.

A still further aspect of the invention provides a fuel cell stack comprising MEAs according to the invention. The stack is built up by sandwiching MEAs between bipolar FFPs. Terminal FFPs are placed adjacent to the MEAs at either end of the stack. Humidification plates, cooling plates and end plates may also be incorporated into the stack. It is possible to build up the stack using ICAs according to the invention. The ICAs comprise MEAs and FFPs, so a stack can be built by placing the FFP of one ICA adjacent to the MEA of the next ICA. The invention provides a fuel cell stack with integral gasketing such that no further gasketing is required.

Further aspects of the invention provide processes for the production of MEAs and ICAs according to the invention.

There are several ways of producing the MEA. A first step is to form the gasket member onto the peripheral region of the electrically conductive sheet material. The electrically conductive sheet material can be provided in the form of a roll or sheet good so should be cut to the correct size. In a first method, a two component gasket assembly (suitably in the form of two frames) is pre-formed by for example injection moulding, sinter or hot forming. The polymer used may be a thermoplastic or thermoset polymer. Suitably one half of the frame incorporates a rebate into which the GDS may be laid prior to assembly with the second half of the frame. The two component assembly may be bonded using an adhesive, or simply by using a thermal process to form a continuous bond between the polymer components. If the two component gasket assembly is formed from a thermoplastic polymer it is possible to apply a heated mould to shape the gasket to the desired profile and simultaneously bond the two components together. In a second method the electrically conductive sheet material is placed into a mould and a flowable polymer (either at room temperature or elevated temperature such that the integrity of the substrate in not compromised) is injected into a profiled cavity and allowed to solidify.

An electrocatalyst layer may be applied to the electrically conductive sheet material either before or after the application of the gasket. Suitable methods for applying the electrocatalyst layer are well known to those in the art and include screen printing, standard lithographic techniques, flexographic or gravure printing and spraying. The electrocatalyst layer is not applied to the entire surface of the electrically conductive sheet material, but is applied only to the central portion. The electrocatalyst layer may be applied to the entire central portion, but may also be applied to selected regions of the central portion. A GDS comprising an electrocatalyst layer is known as a gas diffusion electrode (GDE).

Alternatively, electrocatalyst layers may be applied to one or both faces of the membrane. Suitable methods for applying the electrocatalyst layer are well known to those in the art and include screen printing, standard lithographic techniques, flexographic or gravure printing and spraying. The electrocatalyst layer is not applied to the entire surface of the membrane, but only to an area that corresponds to the central portion (or selected regions thereof) of the electrically conductive sheet material.

An MEA according to the invention will usually comprise either two GDEs and a polymer membrane, or two GDSs and a catalysed membrane. An MEA comprising one GDS, one GDE, and a membrane with one catalysed face is also within the scope of the invention.

To form the MEA, the membrane (catalysed or uncatalysed) is sandwiched between the GDSs or GDEs. With the aid of an adhesive or using a thermal technique, a gas and fluid impermeable bond is achieved between the membrane and the gasketed regions.

ICAs may be produced by locating an MEA next to an FFP and applying pressure to hold the components together. Alternatively, the MEA may be joined to the FFP using appropriate adhesives or thermal techniques.

For a more complete understanding of the invention, reference is made to the schematic drawings wherein.

The figures do not show entire embodiments of the invention, but show the peripheral portion of the electrically conductive sheet material on the left-hand side of the figure, and the central portion of the electrically conductive sheet material on the right-hand side.

Figure 1:
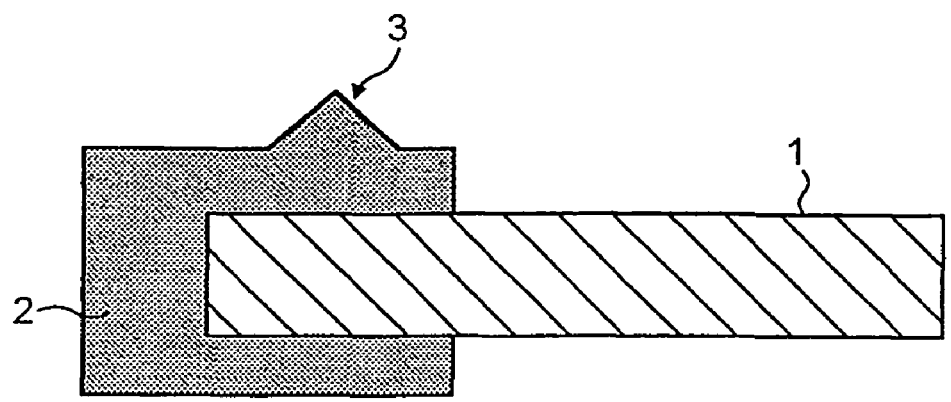
FIG. 1 is a cross-sectional side view of part of a GDS that could be a component of an MEA according to an embodiment of the invention.

FIG. 1 shows a cross-sectional side view of the electrically conductive sheet material (1). The gasket member (2) extends beyond the edge of the peripheral portion of the electrically conductive sheet material, such that the edge of the peripheral portion is enveloped by the gasket member. The gasket member has a rib (3) which will help to aid gasketing between the GDS and an FFP.

Figure 2:
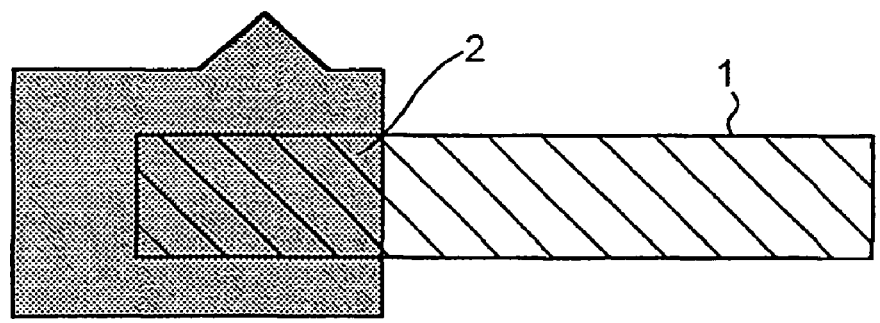
FIG. 2 is a cross-sectional side view of part of a GDS that could be a component of an MEA according to an embodiment of the invention.

FIG. 2 shows electrically conductive sheet material (1) and a gasket member (2) wherein the gasket member impregnates the peripheral portion of the sheet material.

Figure 3:
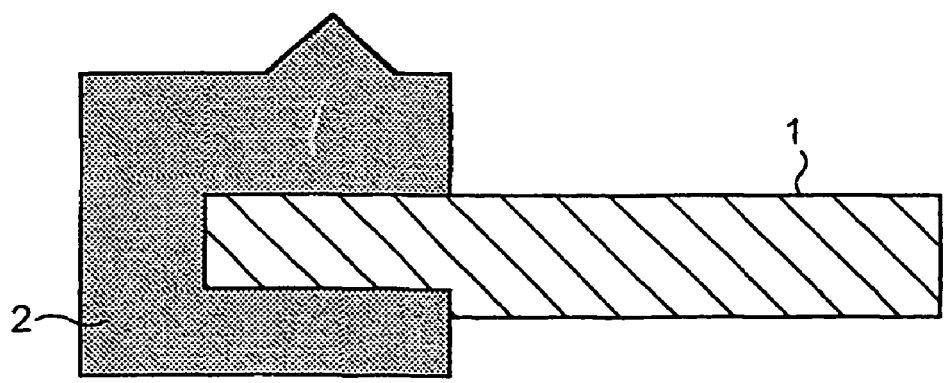
FIG. 3 is a cross-sectional side view of part of a GDS that could be a component of an MEA according to an embodiment of the invention.

FIG. 3 shows electrically conductive sheet material (1) wherein the peripheral portion of the electrically conductive sheet material is thinner than the central portion. This allows a thicker gasket member to be used. Additionally the gasket member (2) is thicker on the top planar face of the sheet material. It is advantageous to maximise the thickness of the gasket member on the face that bonds to the gasket member of another GDS. This prevents excessive thinning during any thermal joining process. Excessive thinning would allow current leakage between the anode and cathode GDS, the effect of which would at the very least be to reduce the cell efficiency. It is also possible that should the anode and cathode GDS contact one another, an electrical short might be created and the cell and even the fuel cell stack would be rendered inoperative. The heat generated during the electrical short circuit may destroy the gasket integrity allowing fuel and oxidant to mix with the associated risk of fire or explosion.

Figure 4:
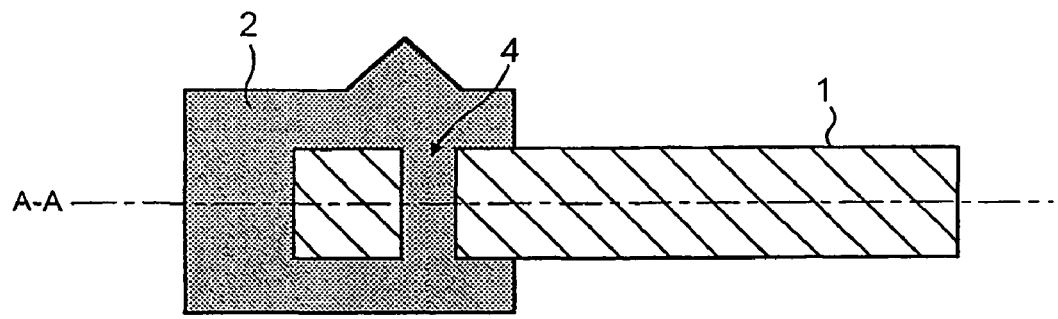
FIG. 4 is a cross-sectional side view of part of a GDS that could be a component of an MEA according to an embodiment of the invention.
Figure 5:
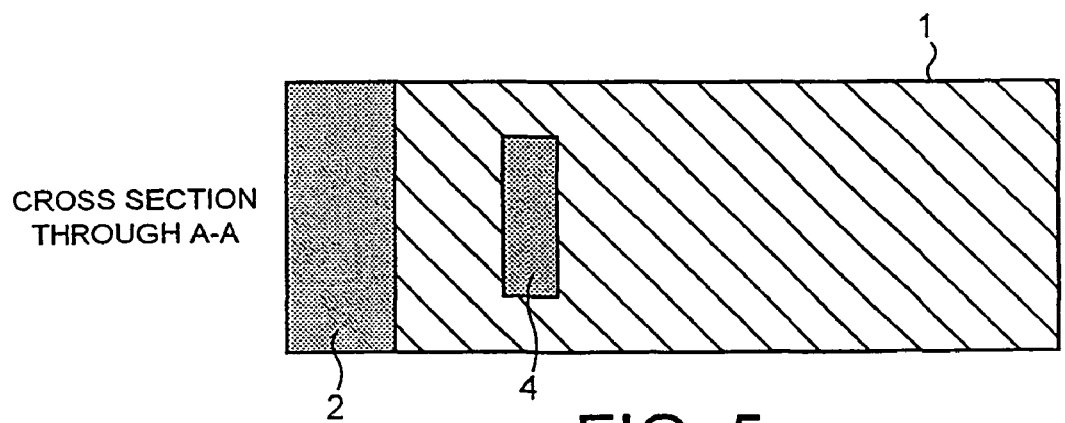
FIG. 5 is a cross-sectional plan view of part of a GDS that could be a component of an MEA according to an embodiment of the invention.

FIG. 4 shows electrically conductive sheet material (1) comprising holes (4) through the thickness of the sheet material. The gasket member (2) extends through the holes (4). FIG. 5 is a cross-sectional plan view of the substrate in FIG. 4.

Figure 6:
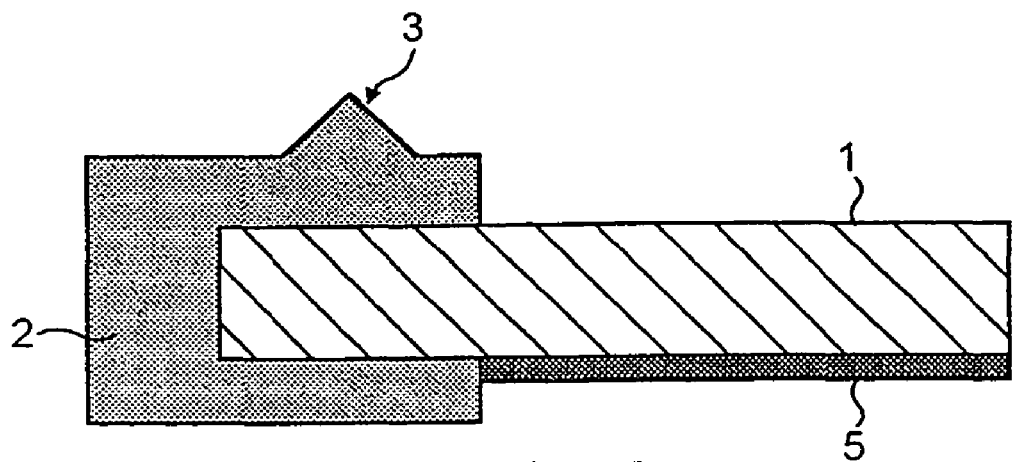
FIG. 6 is a cross-sectional side view of part of a GDE that could be a component of an MEA according to an embodiment of the invention.

FIG. 6 shows a GDE. The electrically conductive sheet material (1) is coated with an electrocatalyst layer (5). The electrocatalyst layer does not extend beneath the gasket (2).

Figure 7:
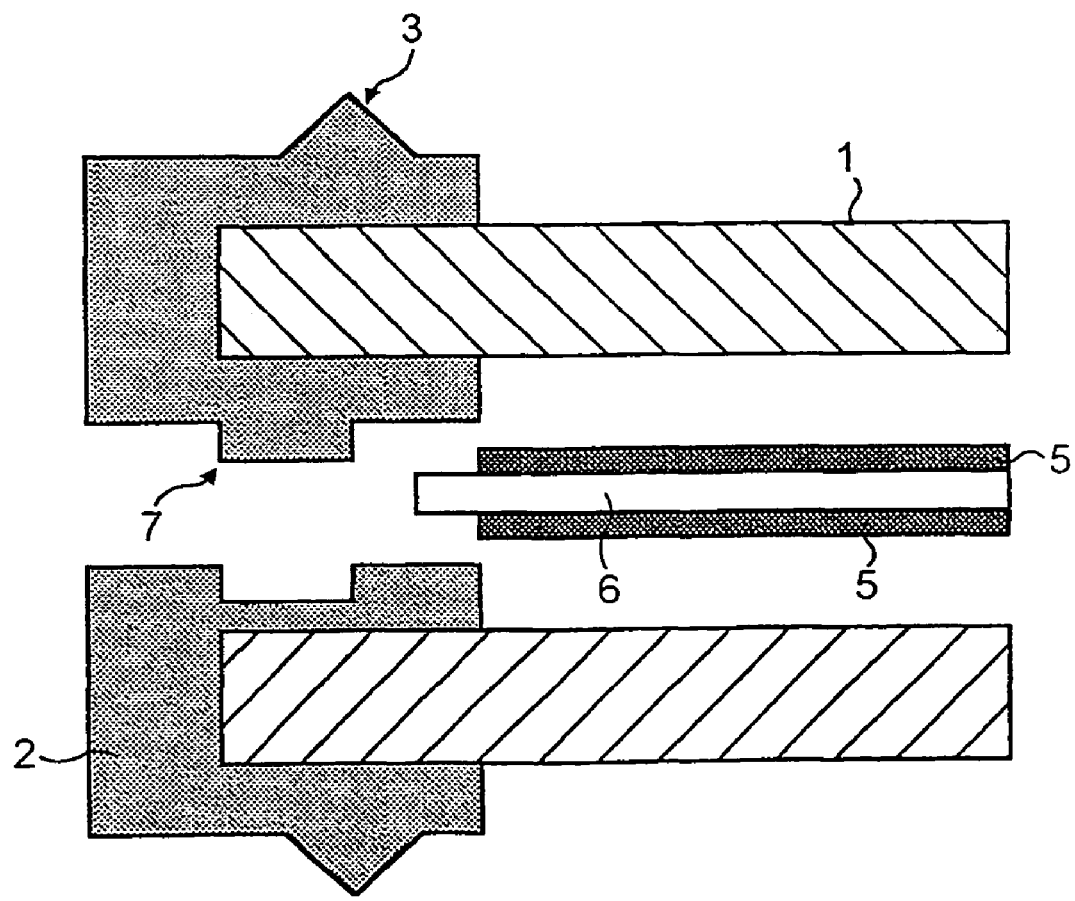
FIG. 7 is a cross-sectional side view of the components in part of an MEA according to an embodiment of the invention.

FIG. 7 shows the components that can make up an MEA according to the invention. Two GDSs comprise electrically conductive sheet material (1) and gasket members (2). The gasket members have ribs (3) and location devices (7). The GDSs are combined with a catalysed membrane comprising electrocatalyst layers (5) and a polymer membrane (6). When the components are combined, the electrocatalyst layers (5) do not extend underneath the gasket members (2), and the membrane (6) does extend as far as the gasket members (2) such that the membrane will be sandwiched between the two gasket members.

Figure 8:
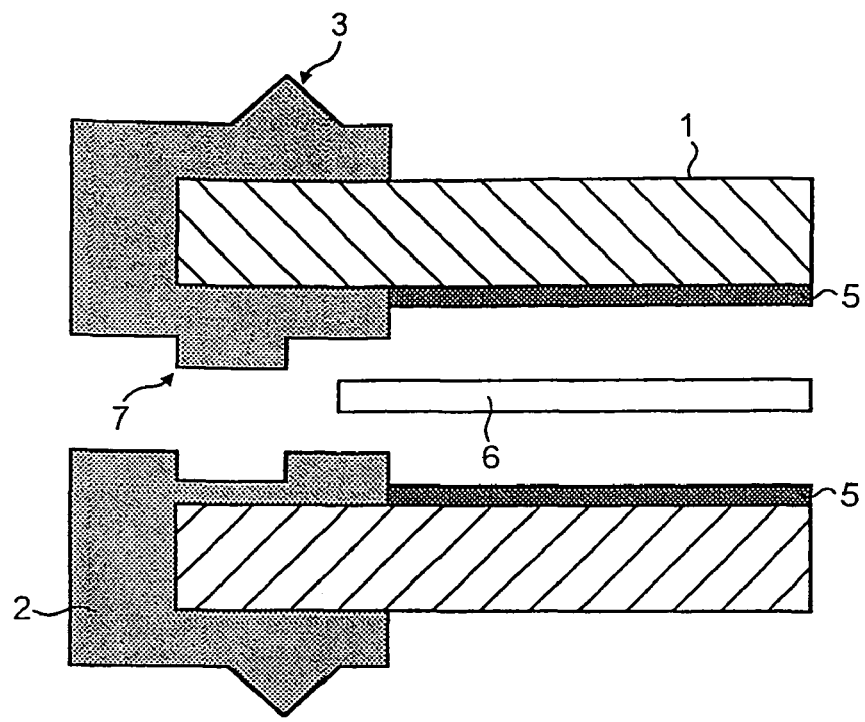
FIG. 8 is a cross-sectional side view of the components in part of an MEA according to an embodiment of the invention.

FIG. 8 shows an alternative configuration of components that can make up an MEA according to the invention. The electrocatalyst layers (5) are part of GDEs that also comprise electrically conductive sheet material (1) and gasket members (2). The two GDEs are, combined with a polymer membrane (6). Again, when the components are combined, the electrocatalyst layers (5) do not extend underneath the gasket members (2), and the membrane (6) does extend as far as the gasket members (2) such that the membrane will be sandwiched between the two gasket members.

Figure 9:
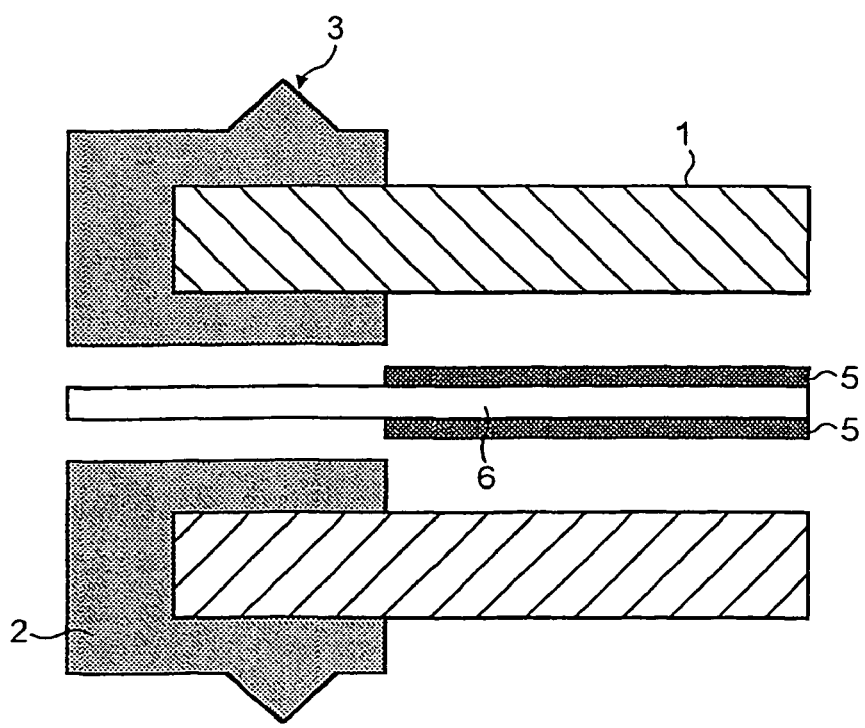
FIG. 9 is a cross-sectional side view of the components in part of an MEA according to an embodiment of the invention.

FIG. 9 also shows the components that can make up an MEA according to the invention. Two GDSs comprise electrically conductive sheet material (1) and gasket members (2). The gasket members have ribs (3) and location devices (7). The GDSs are combined with a catalysed membrane comprising electrocatalyst layers (5) and a polymer membrane (6). When the components are combined, the electrocatalyst layers (5) do not extend underneath the gasket members (2), and the membrane (6) does extend as far as the gasket members (2) such that the membrane will be sandwiched between the two gasket members. In this particular embodiment the membrane (6) extends beyond the gasket members (2) and there is no contact between the two gasket members.

Figure 10:
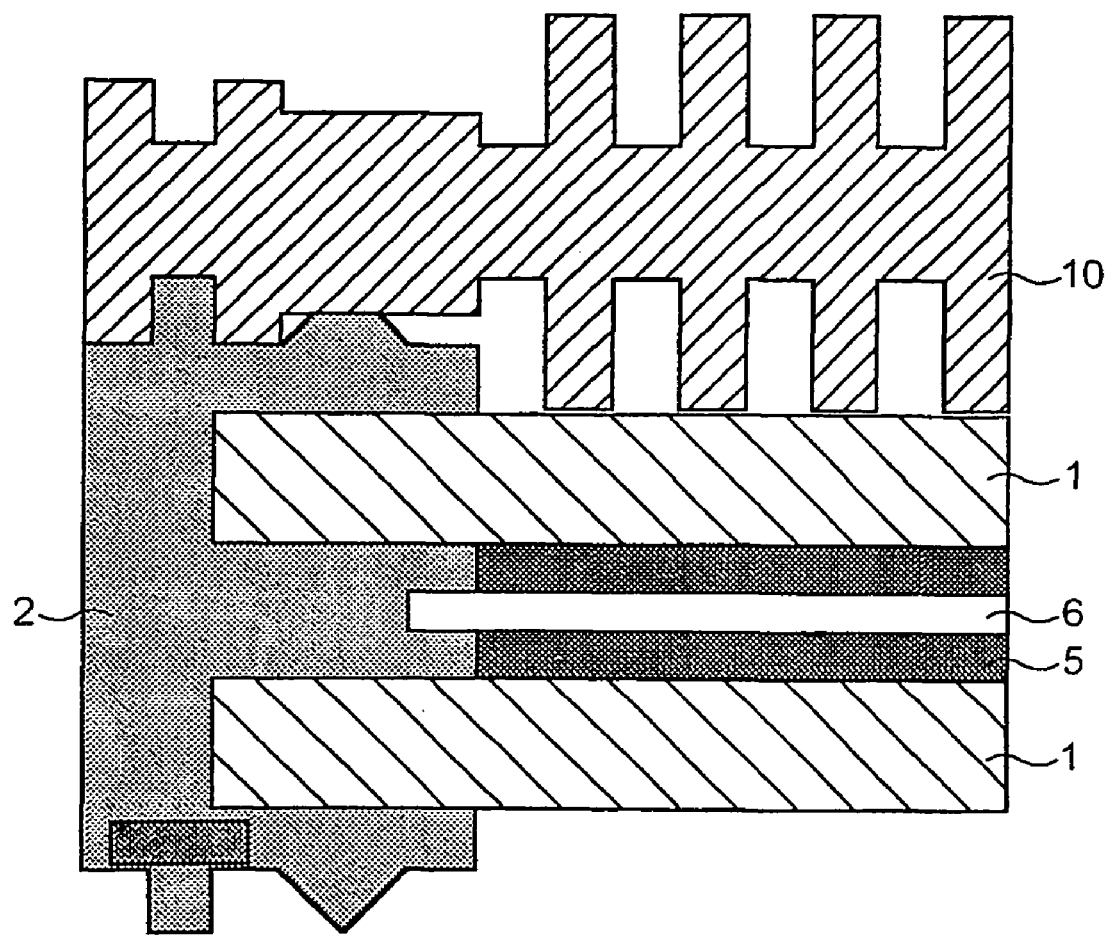
FIG. 10 is a cross-sectional side view of a part of an ICA according to an embodiment of the invention.

FIG. 10 shows an ICA comprising a bipolar FFP (10) and a MEA. The MEA comprises electrically conductive sheet material (1), gasket members (2) (the gasket members on the two sheets have been joined to form an impermeable bond between the components of the MEA), a membrane (6), and electrocatalyst layers (5).

The invention claimed is:

1. A membrane electrode assembly comprising
a proton-conducting membrane, two electrocatalyst layers and two gas diffusion substrates such that the membrane is interposed between the electrocatalyst layers and one gas diffusion substrate is adjacent to each electrocatalyst layer;
wherein each gas diffusion substrate comprises a porous electrically conductive sheet material and a gasket member, the sheet material having a central portion and a peripheral portion, the peripheral portion having first and second planar faces;
wherein each gasket member is located on the first and second planar faces of the peripheral portion and extends beyond the edge of the peripheral portion in a direction away from the central portion, such that the edge of the peripheral portion is enveloped by the gasket member;
wherein each electrocatalyst layer does not extend beyond the central portion of the porous electrically conductive sheet material;
and wherein the membrane extends beyond the electrocatalyst layers, such that the membrane contacts the gasket members.

2. A membrane electrode assembly according to claim 1, wherein the membrane does not extend beyond the edge of the gasket members.

3. A membrane electrode assembly according to claim 2, wherein the gasket member impregnates the peripheral portion, in addition to being present as a coating on the first and second planar faces of the porous electrically conductive sheet material.

4. A membrane electrode assembly according to claim 2, wherein the gasket member does not impregnate the peripheral portion, but is only present as a coating on the first and second planar faces of the peripheral portion of the porous electrically conductive sheet material.

5. A membrane electrode assembly according to claim 2, wherein the peripheral portion of the porous electrically conductive sheet material comprises a plurality of holes through the thickness of the sheet material, wherein said gasket member extends through said holes in addition to being present on the first and second planar faces of said peripheral portion.

6. A membrane electrode assembly according to claim 2 wherein the gasket member is formed from a polymeric material.

7. A membrane electrode assembly according to claim 1, wherein the gasket member impregnates the peripheral portion, in addition to being present as a coating on the first and second planar faces of the porous electrically conductive sheet material.

8. A membrane electrode assembly according to claim 1, wherein the gasket member does not impregnate the peripheral portion, but is only present as a coating on the first and second planar faces of the peripheral portion of the porous electrically conductive sheet material.

9. A membrane electrode assembly according to claim 1, wherein the peripheral portion of the porous electrically conductive sheet material comprises a plurality of holes through the thickness of the sheet material, wherein said gasket member extends through said holes in addition to being present on the first and second planar faces of said peripheral portion.

10. A membrane electrode assembly according to claim 1 wherein the gasket member is formed from a polymeric material.

11. An integrated cell assembly comprising a membrane electrode assembly according to claim 1, wherein the membrane electrode assembly is joined to a field flow plate.

12. A fuel cell stack comprising membrane electrode assemblies according to claim 1.

13. A fuel cell stack comprising integrated cell assemblies according to claim 11.

14. An integrated cell assembly comprising a membrane electrode assembly according to claim 2, wherein the membrane electrode assembly is joined to a field flow plate.

15. A fuel cell stack comprising membrane electrode assemblies according to claim 2.

16. A fuel cell stack comprising integrated cell assemblies according to claim 14.

17. A process for producing a membrane electrode assembly comprising the steps of:
a) preparing two gas diffusion substrates, in each case by forming a gasket member onto an electrically conductive sheet material, wherein the sheet material has a central portion and a peripheral portion, the peripheral portion having first and second planar faces, such that the gasket member is formed on the first and second planar faces of the peripheral portion and envelops the edge of the peripheral portion;
b) preparing a catalysed membrane by applying electrocatalyst layers to upper and lower surfaces of the membrane in regions that correspond to the central portion of the electrically conductive sheet material; and
c) sandwiching the catalysed membrane between the two gas diffusion substrates and forming a gas and fluid impermeable bond between the membrane and the gasket members.

18. A process for producing a membrane electrode assembly comprising the steps of:
a) preparing two gas diffusion electrodes, in each case by forming a gasket member onto an electrically conductive sheet material, wherein the sheet material has a central portion and a peripheral portion, the peripheral portion having first and second planar faces, such that the gasket member is formed on the first and second planar faces of the peripheral portion and envelops the edge of the peripheral portion;
b) applying electrocatalyst layers to the central portions of the electrically conductive sheet material, either before or after the formation of the gasket member; and
c) sandwiching a membrane between the two gas diffusion electrodes and forming a gas and fluid impermeable bond between the membrane and the gasket members.

19. A process for producing a membrane electrode assembly comprising the steps of:
a) preparing one gas diffusion substrate and one gas diffusion electrode, in each case by forming a gasket member onto an electrically conductive sheet material, wherein the sheet material has a central portion and a peripheral portion, the peripheral portion having first and second planar faces, such that the gasket member is formed on the first and second planar faces of the peripheral portion and envelops the edge of the peripheral portion;

b) preparing a membrane with one catalysed face by applying an electrocatalyst layer to a surface of the membrane that corresponds to the central portion of the electrically conductive sheet material of the gas diffusion substrate;

c) applying an electrocatalyst layer to a central portion of an electrically conductive sheet material of the gas diffusion electrode, either before or after the formation of the gasket member; and d) sandwiching the membrane with one catalysed face between the gas diffusion substrate and the gas diffusion electrode, and forming a gas and fluid impermeable bond between the membrane and the gasket members.

* * * * *

UNITED STATES PATENT AND TRADEMARK OFFICE
CERTIFICATE OF CORRECTION

| | | |
|---|---|---|
| PATENT NO. | : 7,396,610 B2 | Page 1 of 1 |
| APPLICATION NO. | : 10/477959 | |
| DATED | : July 8, 2008 | |
| INVENTOR(S) | : Christopher James Barnett et al. | |

It is certified that error appears in the above-identified patent and that said Letters Patent is hereby corrected as shown below:

On the Title Page Item (57), in the Abstract, at line 3, after "conductive," insert --sheet material, wherein an integral--.

Signed and Sealed this

Twenty-third Day of December, 2008

JON W. DUDAS
*Director of the United States Patent and Trademark Office*